United States Patent [19]

Chesnoy

[11] Patent Number: 5,311,351
[45] Date of Patent: May 10, 1994

[54] OPTICAL PULSE SOURCE, AND A SOLITON OPTICAL TRANSMISSION SYSTEM INCLUDING THE SOURCE

[75] Inventor: José Chesnoy, Paris, France

[73] Assignee: Alcatel Cit, Paris, France

[21] Appl. No.: 46,488

[22] Filed: Apr. 13, 1993

[30] Foreign Application Priority Data

Apr. 15, 1992 [FR] France .................. 90 04652

[51] Int. Cl.$^5$ ............................... H04B 9/00
[52] U.S. Cl. ..................... 359/264; 359/184
[58] Field of Search .............. 359/264, 184, 186

[56] References Cited

U.S. PATENT DOCUMENTS

| | | | |
|---|---|---|---|
| 4,264,135 | 4/1981 | Lang | 359/264 |
| 4,633,524 | 12/1986 | Hasegawa | |
| 5,140,656 | 8/1992 | Hasegawa et al. | 385/24 |

OTHER PUBLICATIONS

Optics Letters, vol. 15, No. 10, May, 1990, New York, US, pp. 588–590, XP000132544, M. Nakazawa et al: "Generation and transmission of optical solitons in the gigahertz region using a directly modulated distributed-feedback laser diode".

Electronics Letters, vol. 20, No. 3, Feb. 2, 1984, Stevenage, GB, pp. 132–133, S. K. Korotky et al: "14 Gbit/s optical signal encoding for l=1,32 micrometer with double pulse drive of a Ti: LiNbO3 waveguide modulator".

Primary Examiner—Mark Hellner
Attorney, Agent, or Firm—Sughrue, Mion, Zinn, Macpeak & Seas

[57] ABSTRACT

The source includes an electro-absorption modulator receiving a continuous light wave supplied by a laser emitter 10. The characteristic response curve of the modulator has a threshold so that the modulator transmits an optical pulse having a duration which is less than the duration of an electrical control pulse which is applied to the modulator by a control generator. Soliton-type optical pulses obtained in this way are transmitted via a line fiber to a receiver. Application to optical transmission.

7 Claims, 3 Drawing Sheets

OPTICAL PULSE SOURCE, AND A SOLITON OPTICAL TRANSMISSION SYSTEM INCLUDING THE SOURCE

FIELD OF THE INVENTION

The present invention concerns forming short optical pulses used, in particular, to transmit data over an optical fiber. It is known that the combined action of the dispersive optical effect and of the Kerr-type non-linear optical effect that are caused by such a fiber enables suitably-shaped short pulses referred to as "solitons" to propagate without being deformed. That is why consideration is being given to using such pulses in high-rate transoceanic transmission (6,000 km to 9,000 km). Transmission over such large distances is achieved by solitons propagating along fibers whose losses are compensated by erbium-doped fiber optical amplifiers.

BACKGROUND OF THE INVENTION

Soliton transmission requires a stream of periodically-emitted short light pulses. For example, for 10 Gbit/s transmission, the pulses must measure about 20 ps (at half-intensity). Moreover the pulses must be close to the "Fourier transform limit", i.e. the product of pulse duration multiplied by pulse spectrum width must be less than a limit of about 0.7.

In a first known method, such pulses can be generated by mode coupling in a semiconductor laser having an external cavity. That method is described by D. M. Bird, R. M. Fatah, M. K. Cox, P. D. Constantine . . . , Electronics letter 26, p. 2086 (1990). A second known method uses gain switching in a monolithic semiconductor laser and is described by L. M. Downey, J. F. Bowers, R. S. Tucker, and E. Agyekum, IEEE, J. Quant. Elec. QE 23, 1039 (1987).

The first method requires a complex laser which is difficult to use, and which is therefore unsuitable for use on site. The second method makes it possible to obtain pulses that are short, but they are very remote from the Fourier limit. Recompression requires a fiber which has abnormal dispersion and which is very long (several kilometers), and there is no certainty that the pulse that is finally obtained will satisfy the conditions for soliton propagation. However, spectral filtering enables satisfactory pulses to be obtained, as indicated by M. Nakazama, K. Suzuki, and Y. Kimura, Optics Letters 15, p. 715 (1990). But that requires critical centering of the filtering device.

OBJECT AND SUMMARY OF THE INVENTION

A particular object of the invention is to overcome the drawbacks of those known methods.

To this end, the invention provides, in particular, an optical pulse source including an electro-optical modulator receiving a light wave and having a threshold characteristic curve so as to transmit an optical pulse having a duration less than the duration of an electrical control pulse which is applied to the modulator.

MORE DETAILED DESCRIPTION

Figure 1:
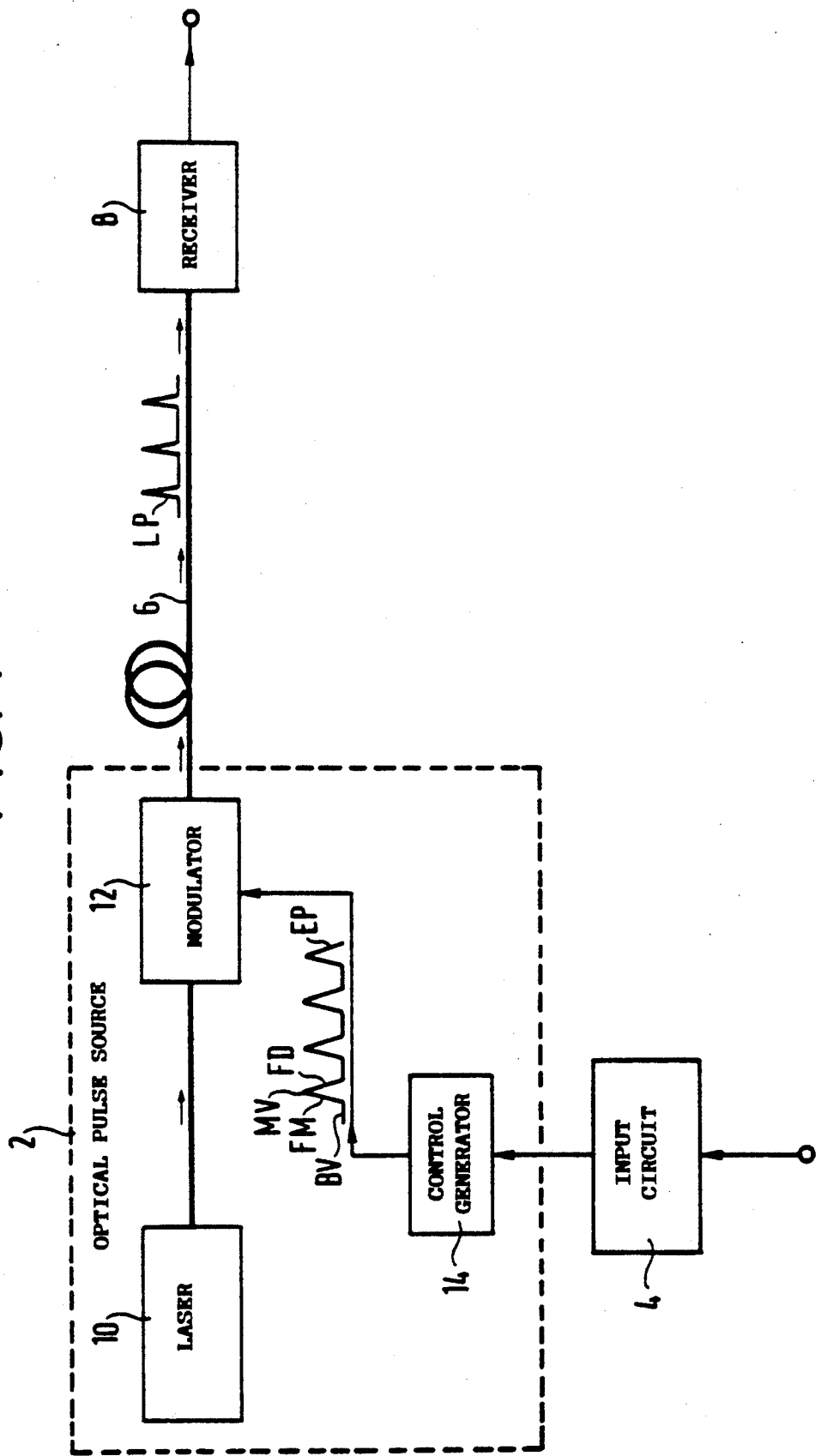
FIG. 1 shows a transmission system using a source of the invention.

The transmission system shown in FIG. 1 includes the following known elements:

an optical pulse source 2 for supplying an optical pulse LP each time it receives a command to that effect;

an input circuit 4 receiving data to be transmitted and controlling the source such that it supplies a succession of optical pulses, in which succession the time offsets between the successive optical pulses are representative of the data to be transmitted; this data may be represented in particular in binary form by pulses being present or absent at instants forming a regular sequence at a predetermined pitch, whereby time offsets appear between successive pulses, which time offsets are sometimes equal to the pitch and sometimes equal to a multiple of the pitch;

a line fiber 6 constituted by a very long optical fiber receiving said succession of optical pulses, and having both chromatic dispersion and a Kerr effect; it is known that, in such a fiber, the dispersion and the Kerr effect compensate each other to maintain the shape of an optical pulse when the optical pulse has intensity, duration and spectrum width that are characteristic of a soliton in the fiber; and a receiver 8 receiving the optical pulses transmitted by said line fiber and processing the received pulses to retrieve said data to be transmitted.

The optical pulse source 2 includes the following elements:

an optical emitter 10 for supplying a light wave; the emitter is a laser emitting a continuous wave;

an electrically-controlled optical modulator 12 for receiving the light wave and transmitting it in controlled manner; and a control generator 14 for supplying an electrical-type control signal for controlling the modulator; the generator supplies the signal in the form of a control pulse EP having firstly a leading edge FM from a base value BV to a maximum signal value MV and secondly a trailing edge FD returning to the base value; the modulator 12 stops said light wave when the signal has the base value; the modulator therefore transmits said light wave in the form of an optical pulse LP whose duration is defined by the control pulse;

In accordance with the present invention the modulator 12 is a modulator having a threshold and whose optical transmittance T reaches a perceptible value only when said control signal exceeds a threshold D lying between said base value BV and said maximum signal value MV. The transmittance is the ratio of the intensity of an output light beam of the modulator divided by the intensity of an input light beam that has given rise to an output beam. Preferably, the value of the threshold D lies in the range 50% to 90% of the maximum value MV starting from the base value BV, and the optical transmittance varies following a monotonic S curve as a function of the value of the control signal.

The control signal is supplied in the form of a control pulse EP having a leading edge FM and/or a trailing edge FD that is/are progressively sloping, whereby said optical pulse is shorter than the control pulse. More specifically, the control signal varies following a bell curve as a function of time.

Figure 2:
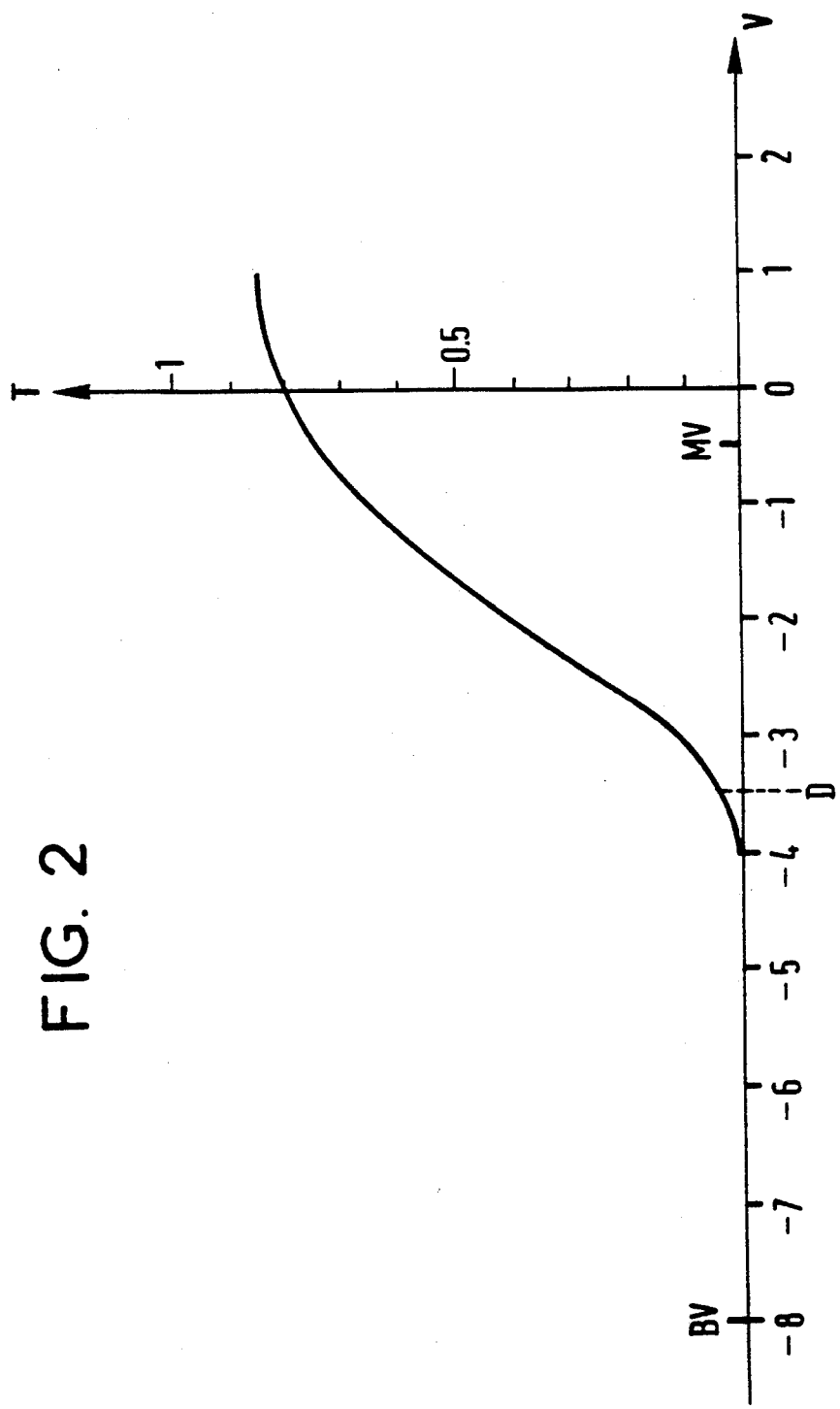
FIG. 2 shows the characteristic curve of an electro-absorption modulator used in the source.

The optical transmittance of the modulator 12 is shown up the y-axis in FIG. 2, with the control signal being plotted along the x-axis in volts. For the threshold D indicated in the figure, the value of the optical transmittance is about 0.05.

Figure 3:
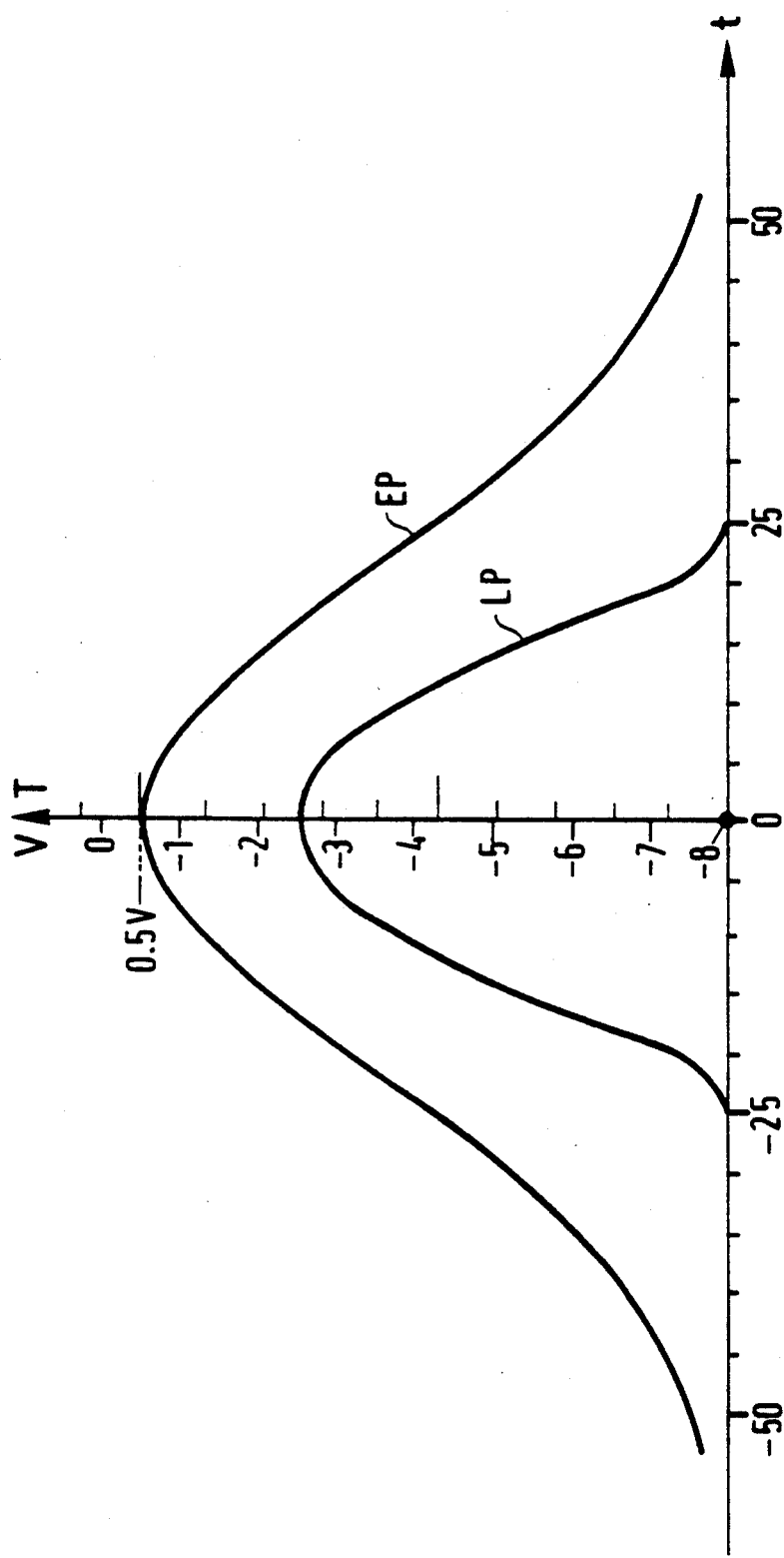
FIG. 3 shows a control pulse and an optical pulse of the source.

The variation in the control signal is shown in volts by the EP diagram in FIG. 3, time being plotted along the x-axis in picoseconds. The LP diagram shows the shape of the optical pulse, which shape corresponds to the variation in the transmittance T of the modulator because the intensity of the light wave supplied by the emitter 10 remains constant. The optical pulse LP has a half-height duration of 28 ps, whereas the control pulse has a half-height duration of 50 ps.

In general, the control generator 14 is preferably chosen so as to supply a control pulse EP having a half-height duration of less than 80 ps.

The modulator 12 is an electro-absorption modulator chosen so as to supply an optical pulse LP having a half-height duration of less than 30 ps. Moreover, the phase modulation imparted to the pulse by the modulator is very small and such that the product of the pulse duration multiplied by the pulse spectrum width is less than 0.8 and preferably less than 0.7, which is close to the Fourier transform limit.

The characteristics of such a modulator are to be found in the thesis in physical sciences by E. Bigan, December 1991, Orsay Faculty, France.

It will be understood that the control generator 14 may supply the pulses EP in various ways, in particular in the form of arcs of a sinusoidal signal supplied by an oscillator, the arcs being used directly to supply a periodic control signal, or else only some of the arcs being selected to constitute control pulses so as to represent the data to be transmitted.

I claim:

1. An optical pulse source comprising:
   an optical emitter for supplying a light wave;
   an electrically-controlled optical modulator receiving said light wave and having a threshold characteristic curve so as to transmit an optical pulse having a duration less than the duration of an electrical pulse applied to the modulator; and
   a control generator for supplying an electrical-type control signal for controlling the modulator, the generator supplying the signal in the form of a control pulse having firstly a leading edge from a base value to a maximum signal value and secondly a trailing edge returning to the base value, the modulator stopping said light wave when the signal has the base value, whereby the modulator transmits said light wave in the form of an optical pulse whose duration is defined by the control pulse;
   wherein said modulator is a modulator having a threshold and whose optical transmittance reaches a perceptible value only when said control signal exceeds a threshold lying between said base value and said maximum signal value;
   said control pulse having a leading edge and/or a trailing edge that is/are progressively sloping, whereby said optical pulse is shorter than the control pulse.

2. A source according to claim 1, wherein the value of said threshold lies in the range 50% to 90% of said maximum value starting from said base value of the control signal.

3. A source according to claim 2, wherein the optical transmittance of said modulator varies following a monotonic S-curve as a function of the value of said control signal, and said control signal varies following a bell curve as a function of time.

4. A source according to claim 3, wherein said control generator is chosen so as to supply a control pulse having a half-height duration of less than 80 ps.

5. A source according to claim 4, wherein said modulator is an electro-absorption modulator chosen so as to supply an optical pulse having a half-height duration of less than 30 ps, and the product of its duration multiplied by its spectrum width being less than 0.8 and preferably less than 0.7.

6. A soliton optical transmission system including:
   an optical pulse source for supplying optical pulses on command, said optical pulse source comprising:
   an optical emitter for supplying a light wave;
   an electrically-controlled optical modulator receiving a light wave and having a threshold characteristic curve so as to transmit an optical pulse having a duration less than the duration of an electrical pulse applied to the modulator; and
   a control generator for supplying an electrical-type control signal for controlling the modulator, the generator supplying the signal in the form of a control pulse having firstly a leading edge from a base value to a maximum signal value and secondly a trailing edge returning to the base value, the modulator stopping said light wave when the signal has the base value, whereby the modulator transmits said light wave in the form of an optical pulse whose duration is defined by the control pulse;
   wherein said modulator is a modulator having a threshold and whose optical transmittance reaches a perceptible value only when said control signal exceeds a threshold lying between said base value and said maximum signal value;
   said control pulse having a leading edge and/or a trailing edge that is/are progressively sloping, whereby said optical pulse is shorter than the control pulse;
   an input circuit receiving data to be transmitted and controlling the source such that it supplies a succession of optical pulses, in which succession the time intervals between the optical pulses are representative of the data to be transmitted;
   a line fiber constituted by a very long optical fiber receiving said succession of optical pulses, and having both chromatic dispersion and a Kerr effect such that the dispersion and the Kerr effect compensate each other to maintain the shape of an optical pulse when the optical pulse has intensity, duration and spectrum width that are characteristic of a soliton in the fiber; and
   a receiver receiving the optical pulses transmitted by said line fiber and processing the received pulses to retrieve said data to be transmitted; and
   wherein said optical pulse source supplies said optical pulses in the form of said solitons of said line fiber.

7. A system according to claim 6, wherein said modulator in the optical pulse source is an electro-absorption modulator.

* * * * *